United States Patent [19]

Johnson

[11] 4,430,146

[45] Feb. 7, 1984

[54] BELT SPLICING APPARATUS AND METHOD AND SPLICE FORMED THEREBY

[75] Inventor: Eric R. Johnson, Charlotte, N.C.

[73] Assignee: Scandura, Inc., Charlotte, N.C.

[21] Appl. No.: 351,237

[22] Filed: Feb. 22, 1982

[51] Int. Cl.³ .............................................. B30B 15/34
[52] U.S. Cl. ................................ 156/502; 100/93 P; 156/583.1; 156/583.4; 156/583.9; 219/243
[58] Field of Search ...................... 156/157, 304.6, 502, 156/583.1, 583.2, 583.4, 583.9; 100/93 P; 219/243

[56] References Cited

U.S. PATENT DOCUMENTS

| | | | |
|---|---|---|---|
| 2,904,100 | 9/1959 | Fener | 156/583.2 |
| 3,008,028 | 11/1961 | Christensson | 156/583.1 |
| 3,480,505 | 11/1969 | Donnell, Jr. et al. | 156/583.2 |
| 3,660,210 | 5/1972 | Chapman | 156/583.1 |
| 4,211,594 | 7/1980 | Freitag et al. | 156/157 |

Primary Examiner—Michael G. Wityshyn
Attorney, Agent, or Firm—Richards, Shefte & Pinckney

[57] ABSTRACT

Apparatus for splicing thermoplastic coated belts is disclosed having a pair of longitudinal bars on which are respectively mounted platen heating assemblies, one bar being centrally supported pivotably on a clamping arrangement and the other bar being removably connectable with the clamping arrangement in a manner permitting pivotable positioning of the bar about one end thereof for pivotable disposition of the bars with their platens in opposed facing parallel relation at various spacings therebetween to permit uniform engagement by the bars of opposite sides of belt ends of varying thicknesses, and the clamping arrangement is adapted for bolted drawing of the bars together to grippingly retain the belt ends. The components of the apparatus are arranged for serial flow of direct electrical current through the heating assemblies and therebetween through the bars and the clamping arrangement for quick, low energy heating of the belt ends to fuse the thermoplastic material thereof. The apparatus facilitates a new belt splicing method eliminating the conventional need to use supplementary liquid thermoplastic material to effect bonding of the belt ends and thus a new belt splice is provided the spliced ends of which are bonded only by fusion of their respective thermoplastic material.

9 Claims, 9 Drawing Figures

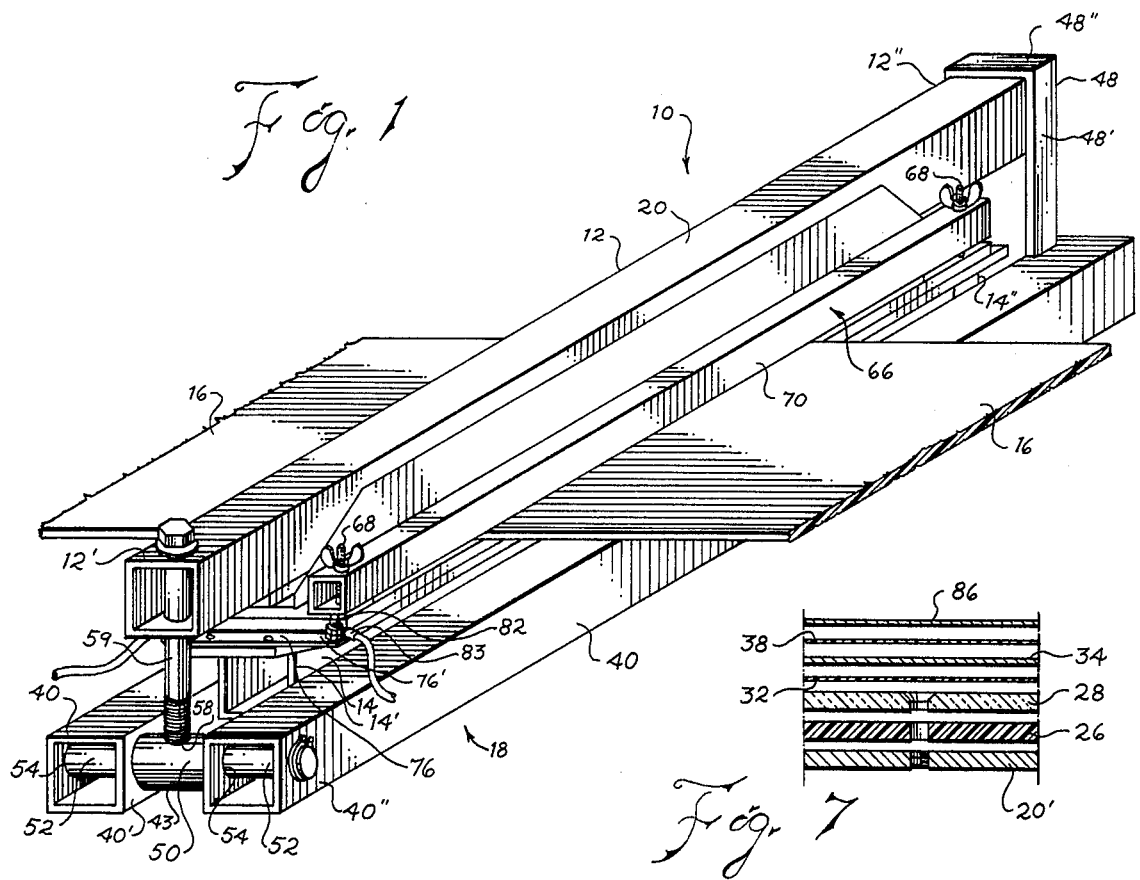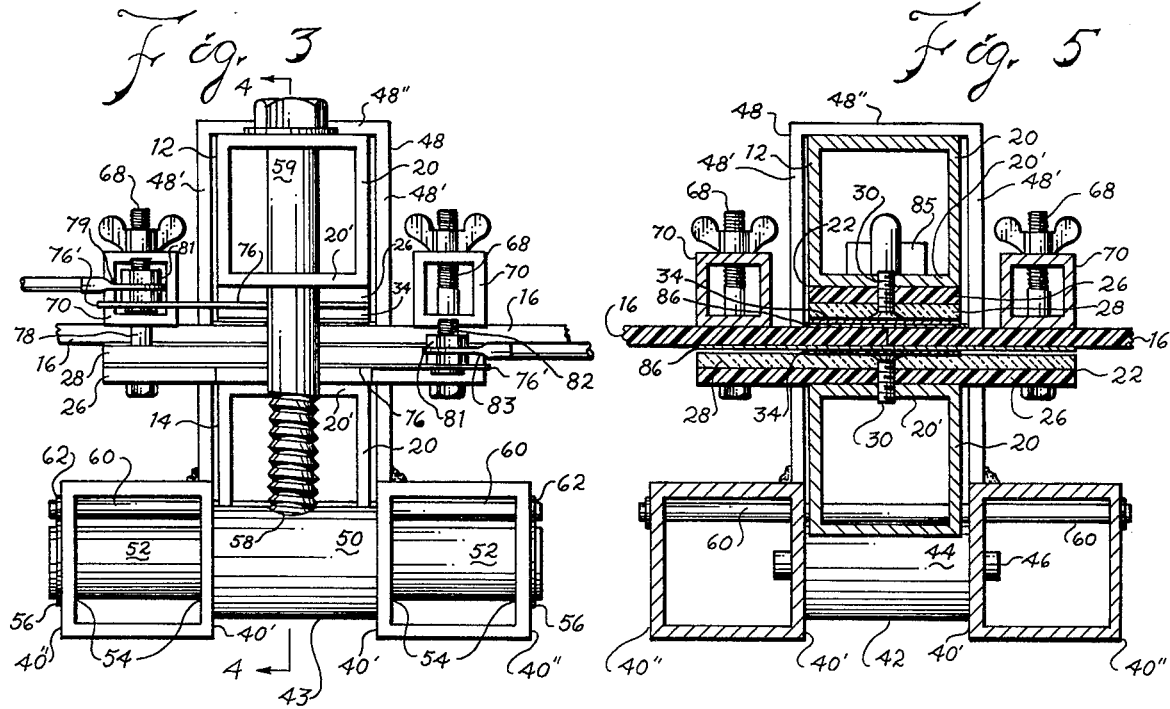

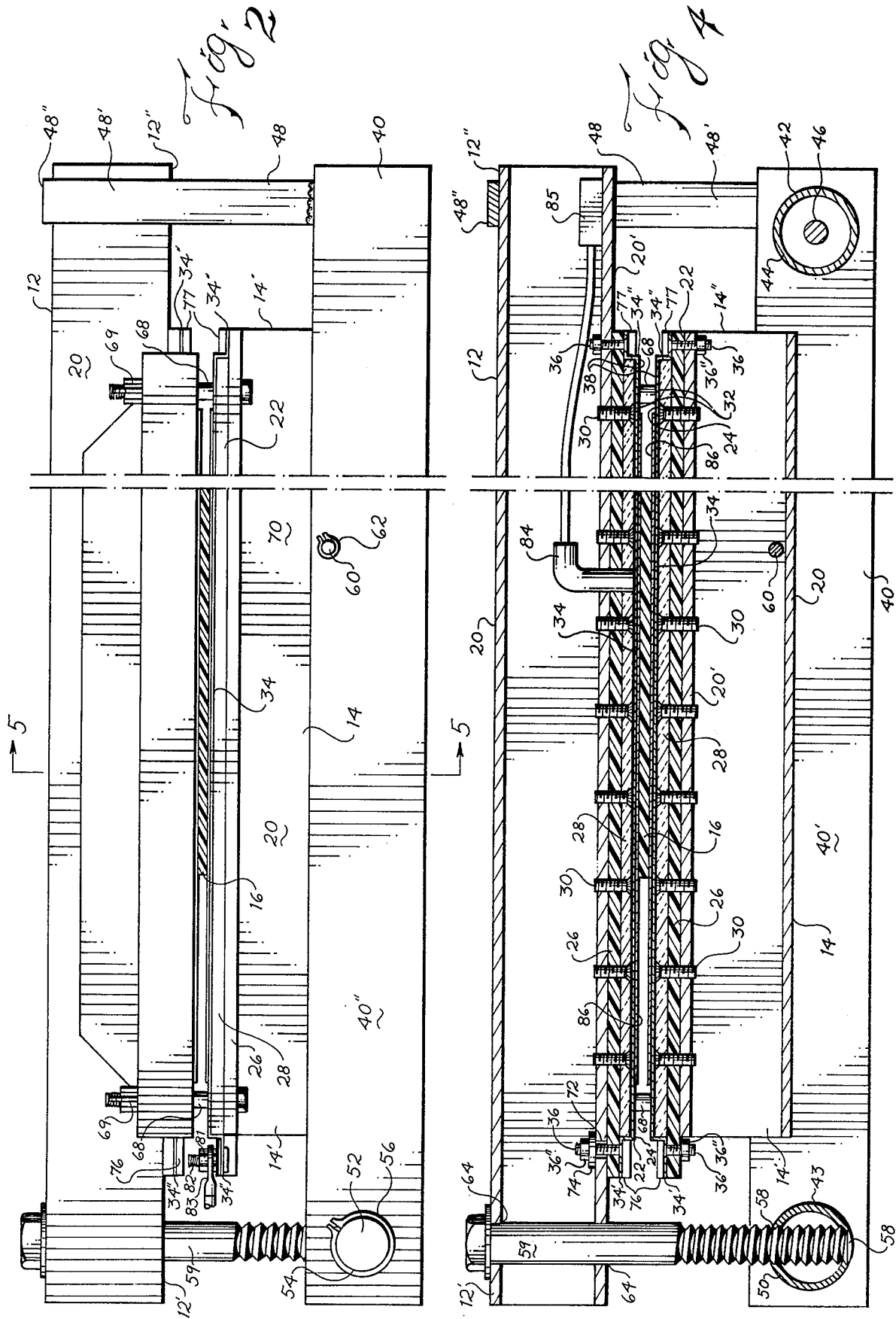

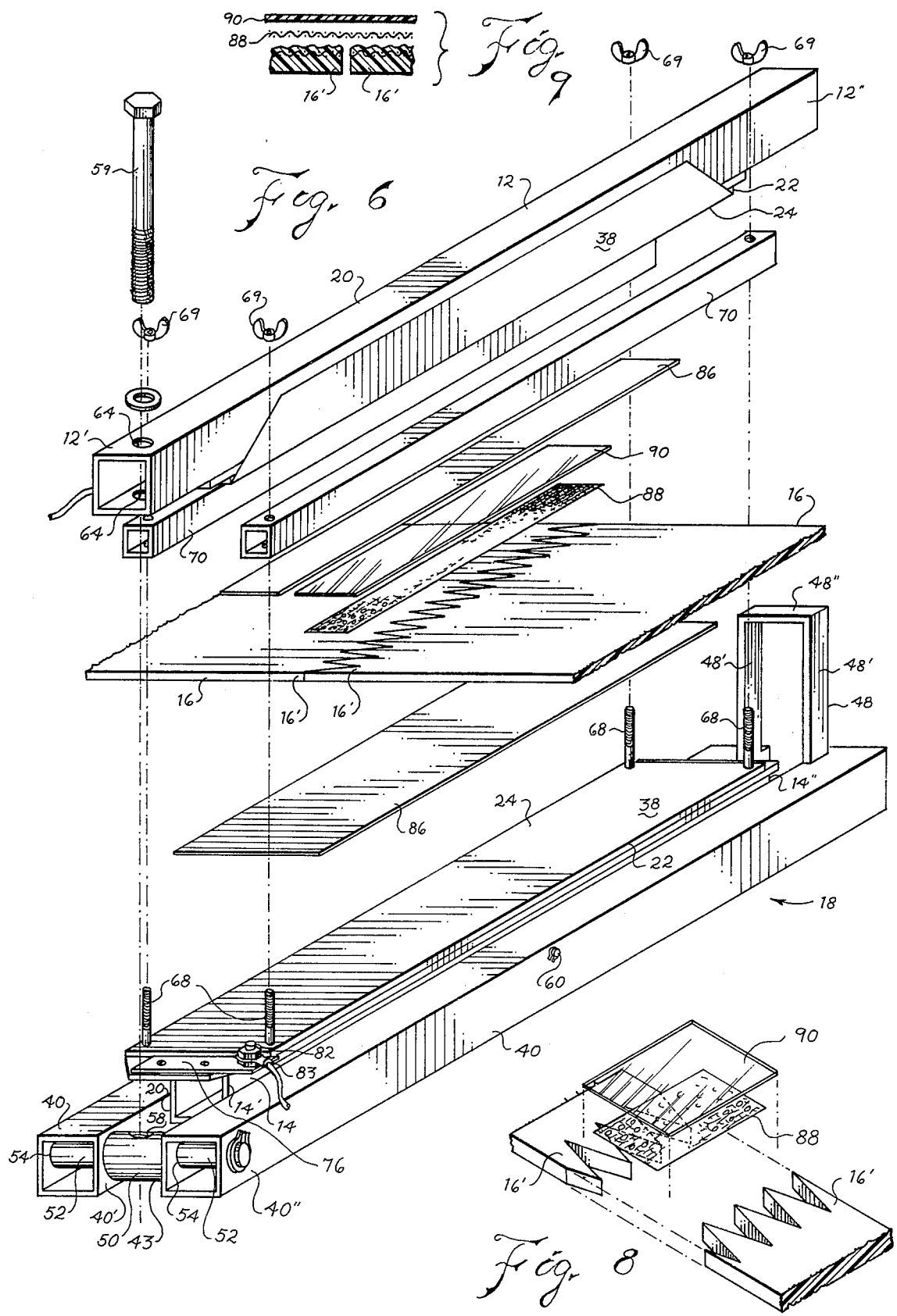

BELT SPLICING APPARATUS AND METHOD AND SPLICE FORMED THEREBY

BACKGROUND OF THE INVENTION

The present invention relates to apparatus and methods of splicing two belt ends and particularly to such apparatus and methods for heat bonding of the two ends to form an endless belt.

Endless belts have innumerable uses in industry. Many such belts are constructed of a material having a woven fabric base coated on one or both sides with a thermoplastic material such as polyvinyl chloride (PVC) or polyurethane, a predetermined length of such material being joined at its ends to produce the desired endless belt. Conventionally, this joinder of belt ends is performed by cutting the respective belt ends to provide in the edges thereof respective pluralities of corresponding V-shaped teeth, thereby to provide a substantially greater belt end surface area for bonding than is provided by a transversely cut belt end; applying to the respective sets of teeth liquid PVC or another appropriate liquid thermoplastic bonding resin; abutting the belt ends in meshing juxtaposed relation; and applying heat to the joined belt ends to effect the bonding thereof by the liquid thermoplastic resin.

While this belt splicing operation produces belts of satisfactory quality and utility, there exist several disadvantages in this state of the art. First, the resultant belt produced is normally substantially weaker at the splice than along the remaining length of the belt which reduces the strength and useful life of the belt as a whole. The use of additional PVC or another thermoplastic resin at the splice additionally adds to the cost and labor of splicing belts. Further, the apparatus presently available for performing the splicing operation is relatively large and time and energy consuming in heating to the necessary temperature for splicing operation. As a result, practically usable apparatus is not available for the construction or repair of spliced belts at their location of use. Accordingly, the initial construction of endless belts must be performed at a location remote from the intended location of use which may create problems in the proper desired dimensioning of the belts and, further, any such belts failing in use, if they are to be repaired, must be returned therefor to the manufacturer.

In contrast, the present invention provides an apparatus and method for forming uniquely stronger splices of belt ends in substantially shorter time and with substantially reduced energy consumption than conventional apparatus and methods, without requiring the application of any additional PVC or another thermoplastic resin.

SUMMARY OF THE INVENTION

According to one aspect of the present invention, a new and novel belt splicing apparatus is provided for splicing the ends of belts of the type having outer surfaces of thermoplastic material which apparatus, briefly described, includes a pair of longitudinal bar assemblies adapted for opposed facing disposition for engaging therebetween two belt ends in juxtaposed relation and a clamping arrangement for selectively engagingly drawing together the two bar assemblies to grippingly retain the belt ends therebetween. The two bar assemblies include on their respective facing sides respective longitudinal platens forming respective belt engaging surfaces for substantially continuous surface contact along the belt ends on opposite sides thereof, each platen including a longitudinal electrical heating arrangement for heating its respective engaging surface.

In accordance with one feature of the belt splicing apparatus, the two bar assemblies and the clamping arrangement are electrically conductive such that the clamping means serves to electrically connect the pair of bar assemblies for flow of electrical current therebetween. Each heating arrangement is electrically connected at one of its ends to its respective bar assembly but is electrically insulated therefrom along the entire remaining length of the heating arrangement, the opposite end of each heating arrangement being electrically connected to one of two opposed terminals of an electrical source. In this manner, upon the clamped assembly of the two bar assemblies by the clamping arrangement, a complete electrical circuit is provided between the electrical source terminals through the platen of each heating arrangement and respectively therefrom through and between the two bar assemblies and connecting clamping arrangement for generating heat in each heating arrangement upon the energization of the electrical source sufficient to splice the two belt ends by melted fusion of the thermoplastic material thereof together and between the meshed teeth thereof.

In accordance with another feature of the belt splicing apparatus, one of the bar assemblies is supported intermediate its ends on the clamping arrangement for pivotal movement in a plane generally coinciding with the direction of drawing by the clamping arrangement. The clamping arrangement is arranged for engaging the other of the two bar assemblies at opposite ends thereof when in the aforesaid opposed facing disposition with such one bar assembly and for permitting generally pivotable positioning of such other bar assembly about one end thereof in the aforesaid coinciding plane of movement of such one bar assembly. In this manner, the bar assemblies are pivotably positionable cooperatively for substantially parallel disposition thereof at varying spacings therebetween for accommodating belt ends of varying thicknesses and operation of the clamping arrangement to draw the two bar assemblies together effects cooperative pivotal movement of the pair of bar assemblies to maintain parallel orientation thereof for uniform surface contact of the belt ends by the respective engaging surfaces of the respective platens of the two bar assemblies and uniform distribution of the clamping pressure exerted by the clamping arrangement along the belt ends. In the preferred embodiment, the clamping arrangement includes a bracket adapted to receive slidably therethrough such one end of such other bar assembly to provide a pivotal fulcrum therefor and provides a bolt arrangement adapted to engage the other end of such other bar assembly which bolt arrangement is adjustably positionable for clamping operation in various pivoted dispositions of such other bar assembly.

One of the bar assemblies includes an auxiliary belt retaining arrangement on opposite sides of its respective platen for grippingly engaging each belt at a spacing from its belt end to hold the belt ends in proper splicing position between the respective platens of the two bar assemblies. Each of the platens is provided with a heat conductive heat distribution plate at its engaging surface for concentrating the heat generated by the respective heating arrangement of each platen at the location of juxtaposition of the belt ends and for applying gradually lesser heat to said belt ends progressively outwardly therefrom thereby to produce a smooth surface to said belt ends across the splice thereof. A thermostatic sensor is provided for sensing the temperature of at least one of the heating arrangements and is operatively associated with the electrical source for deactuation thereof when the heating arrangements reach a predetermined desired temperature.

The present invention further provides a new and novel belt splicing method which eliminates the need for application of additional liquid thermoplastic material and for which the above-described apparatus is particularly adapted. According to such method, the two belt ends are initially prepared in conventional manner for splicing by forming in each thereof a plurality of projecting teeth of corresponding size and shape and thereafter the prepared belt ends are arranged in juxtaposed relation with their respective teeth interdigitatedly meshed. With the belt ends so prepared and arranged, pressure and heat are applied to the belt ends to cause the thermoplastic material of their respective outer surfaces to meltingly flow together and between the meshed teeth, after which the belt ends are cooled to solidify the melted thermoplastic material thereof to bond the belt ends together.

This method is adaptable to the splicing of belt ends both sides of which have outer surfaces of thermoplastic material and of belt ends one side of which has such an outer surface and the other side of which has an outer surface of non-thermoplastic material. When belt ends of the latter type are to be spliced, the belt ends are arranged with their respective thermoplastic and non-thermoplastic sides in correspondence, and thereafter a length of scrim material is superposed over the thus juxtaposed belt ends on the non-thermoplastic surfaces thereof and a length of thermoplastic material, preferably polyurethane, is superposed over the scrim material, the application of pressure and heat causing the thermoplastic length to meltingly flow into and across the scrim material into contact with the non-thermoplastic sides of the belt ends and between the meshed teeth thereat and the subsequent cooling causing solidification of the thermoplastic length and bonding thereof to the scrim material and the non-thermoplastic sides of the belt ends and between the meshed teeth thereof.

The above-described apparatus and method of the present invention produce a new and novel belt splice wherein the respective thermoplastic outer sides of the belt ends and their respective meshed teeth are meltingly fused and bonded together in the aforesaid juxtaposed and interdigitated disposition without the use of any supplemental liquid thermoplastic material. As will be understood, the form of the belt splice wherein belt ends having thermoplastic and non-thermoplastic sides are joined further includes on the non-thermoplastic side of the splice the length of scrim material superposed over the belt ends with the length of thermoplastic material meltingly fused into and across the scrim material and bonded thereto and to the non-thermoplastic sides of the belt ends and between the meshed teeth thereof.

BRIEF DESCRIPTION OF THE DRAWINGS

FIG. 1 is a perspective view of the belt splicing apparatus of the present invention in splicing operation;

FIG. 2 is a side elevational view of the belt splicing apparatus of FIG. 1;

FIG. 3 is a left end elevational view of the belt splicing apparatus of FIG. 1;

FIG. 4 is a vertical sectional view of the belt splicing apparatus of FIG. 1 taken along line 4—4 of FIG. 3;

FIG. 5 is a vertical sectional view of the belt splicing apparatus of FIG. 1 taken along line 5—5 of FIG. 2;

FIG. 6 is an exploded perspective view of the belt splicing apparatus of FIG. 1;

FIG. 7 is an exploded cross-sectional view of the lower platen and bar assembly of the belt splicing apparatus of FIG. 1 also taken along line 5—5 of FIG. 2;

FIG. 8 is an exploded perspective view of respective portions of the components of two belt ends, a length of scrim material and a length of thermoplastic sheet material comprising a splice according to the present invention; and FIG. 9 is a cross-sectional view of the belt splice components of FIG. 8.

DESCRIPTION OF THE PREFERRED EMBODIMENT

Referring now to the accompanying drawings, the apparatus of the present invention is illustrated as preferably embodied for the splicing of the ends of substantially planar belts of the type having the outer surface of at least one side thereof coated with or otherwise formed of a thermoplastic material such as polyvinyl chloride (PVC), polyurethane or the like. The present apparatus is adapted for joining two belt ends is juxtaposed, substantially co-planar relationship, the belt ends preferably having been prepared for such joinder by cutting a plurality of V-shaped teeth of corresponding size in each belt end for interdigitatedly meshed juxtaposition of the belt ends (see FIG. 8), all as is conventional.

Looking initially to FIG. 1, the belt splicing apparatus of the present invention is indicated generally at 10 and basically includes a pair of longitudinal bar assemblies 12, 14 adapted for opposed facing disposition for engaging therebetween the prepared ends 16' of two belts 16 in the aforesaid juxtaposed interdigitated relation and a clamping arrangement, generally indicated at 18, for selectively engagingly drawing the pair of bar assemblies 12, 14 together to grippingly retain the belt ends 16' therebetween in such juxtaposed relation.

Each bar assembly 12, 14 includes a length of conventional square steel tubing 20 along one side 20' of which is affixed a platen heating assembly 22 forming a longitudinal, substantially planar belt engaging surface 24. Each platen assembly 22 is compositely formed as a sandwich (see FIG. 7) including a planar sheet of LEXAN brand polymeric material 26 manufactured by the General Electric Co., Schenectady, N.Y., superposed on the aforesaid one side 20' of the tubing 20 in parallel relation thereto and a planar sheet of asbestos 28 superposed on the LEXAN sheet 26 in parallel relation thereto, the two sheets 26, 28 being affixed to the steel tubing 20 in such disposition by a plurality of countersunk screws 30 threadedly extending engagingly through the two sheets 26, 28 and the side 20' of the tube 20 (FIG. 2). A length of adhesive-backed tape 32 of the type coated on its non-adhesive side with TEFLON brand resin manufactured by E. I. duPont de Nemours & Co., Wilmington, Del., is adhered to the outward surface of the asbestos sheet 28 covering the countersunk heads of the screws 30. The asbestos sheet 28 is slightly shorter in length than the LEXAN sheet 26 and is centered lengthwise of the LEXAN sheet 26 to provide an extension of the LEXAN sheet 26 longitudinally beyond each end of the asbestos sheet. A thin sheet of stainless steel 34 is superposed co-planarly on the tape 32 and is transversely bent at its ends to form steps 34', 34" conforming to the vertically cross-sectional configuration of the composite of the LEXAN and asbestos sheets 26, 28 at their respective ends and copper plates 76, 77 are respectively disposed superposedly on the stepped ends 34', 34" of the stainless steel sheet 34 in surface contact therewith, the stainless steel sheet 34 being affixed with the other components of its platen assembly 22 by conventional countersunk bolt and nut arrangements 36 extending through the copper plates 76, 77 and the stepped ends 34', 34", the particular arrangement of the bolt and nut arrangements 36 being important to the operation of the present apparatus and being hereinafter more fully described. Another length 38 of TEFLON resin coated tape is adhered to the outward surface of the stainless steel sheet 34.

The clamping arrangement 18 includes two square steel tubes 40 of corresponding lengths joined side-by-side at their respective ends at a parallel spacing slightly greater than the width of the square tubes 20 of the bar assemblies 12, 14 by respective spacer tube arrangements 42, 43 extending transversely perpendicularly between the ends of the two square tubes 40. The spacer tube arrangement 42 at one end of the clamping arrangement 18 includes a cylindrical steel tube member 44 of a length corresponding to the aforesaid desired parallel spacing of the tubes 40 disposed between the tubes 40 and a conventional nut and bolt arrangement, representatively indicated at 46, extending centrally through the spacer tube member 44 and through the respective facing side walls 40' of the tubes 40 and tightened thereagainst thereby rigidly joining the tubes 40 at said one end of the clamping arrangement 18. A U-shaped steel bracket 48, the legs 48' of which are also spaced apart the same distance as the aforesaid parallel spacing of the tubes 40, is affixed in inverted disposition bridgingly to the two square tubes 40 by welding or bolting of its legs 48' respectively to the upper surfaces of the tubes 40 immediately above the spacer arrangement 42. The spacer arrangement 43 at the opposite end of the clamping arrangement 18 includes a cylindrical steel tube member 50 like tube member 44 to the opposite ends of which are coaxially affixed respectively cylindrical steel tube members 52 of smaller diameter than the tube member 50 and of a length greater than the width of the tubes 40. Circular holes 54 of a diameter corresponding to that of the smaller tube members 52 are formed in the inner, facing side walls 40' and the parallel outer side walls 40" of the tubes 40 in axial alignment, the tube member 50 being disposed intermediate the tubes 40 with the smaller tube members 52 extending respectively through the holes 54 in the tubes 40, conventional retaining rings 56 being affixed to the extending ends of the tube members 52 to prevent their inward withdrawal through the holes 54, whereby the spacer tube arrangement 43 is rotatable in the holes 54 the purpose of which will hereinafter be explained. The spacer tube member 50 has centrally formed in diametrically opposite sides thereof threaded holes 58 adapted for threadedly receiving a conventional bolt 59 the purpose of which will also hereinafter be explained.

The bar assembly 14 with its platen assembly 22 facing upwardly is longitudinally disposed intermediate the tubes 40 centrally in the spacing formed therebetween by the spacer arrangements 42, 43 at generally equivalent spacings from the ends of the clamping arrangement 18 and the bar assembly 14 is pivotably mounted equidistantly intermediate its ends on the clamping arrangement 18 in such disposition by a cylindrical steel rod 60 extending through appropriately aligned circular holes in the opposed side walls 20' of the tube 20 of the bar assembly 14 and in the inner and outer side walls 40', 40" of the tubes 40, conventional retaining rings 62 being affixed to the outward ends of the rod 60 to prevent its withdrawal through the holes. One end 12' of the bar assembly 12 is provided with axially-aligned circular holes 64 formed in the aforesaid one side of its steel tube 20 along which is affixed its platen assembly 22 and in the side of the tube 20 opposed thereto.

It will accordingly be understood that the assembly of the clamping arrangement 18 and the bar assembly 14 forms the base of the present belt splicing apparatus by which it is adapted to be supported for operation on a table top or any other similarly suitable flat surface by the two clamping arrangement tubes 40 thereby to dispose the belt engaging surface 24 of the platen assembly 22 of the bar assembly 14 in an upwardly facing, generally horizontal disposition for supporting longitudinally centrally therealong the respective belt ends 16' in their aforesaid juxtaposed, interdigitated disposition. In this operational disposition of the assembly of the clamping arrangement 18 and the bar assembly 14, the bar assembly 12 may be removably disposed superposedly thereabove with the belt engaging surface 24 of its platen assembly 22 facing downwardly in opposed, facing disposition to the belt engaging surface 24 of the platen assembly 22 of bar assembly 14 by insertion through the bracket 48 of the end 12" of the bar assembly 12 opposite its aforesaid one end 12' in which are formed the holes 64 and thereafter positioning its end 12' with the holes 64 thereof disposed substantially directly above the location of the holes 58 of the spacer tube member 50 of the clamping arrangement 18 thereby to engage the juxtaposed belt ends 16' between the engaging surfaces 24 of the bar assemblies 12, 14. Upon rotational adjustment of the spacer tube member 50 and fine adjustment of the relative disposition of the bar assembly 12, if necessary, to align their respective holes 58, 64, the bolt 59 may then be extended through the holes 64 in the end 12' of the bar assembly 12 and threadedly through the holes 58 in the spacer tube member 50 and threadedly tightened to cause the two bar assemblies 12, 14 to be drawn together to grippingly retain the belt ends 16' between the engaging surfaces 24 of the respective platen assemblies 22 of the bar assemblies 12, 14.

The above-described arrangement of the bar assemblies 12, 14 and the clamping arrangement 18 will be understood uniquely to provide in the operation of the present apparatus 10 both uniform surface contact of the belt ends 16' by the engaging surfaces 24 of the respective platen assemblies 22 of the bar assemblies 12, 14 and uniform distribution along the belt ends 16' of the clamping pressure exerted by the clamping arrangement 18 in drawing together the bar assemblies 12, 14 in an adjustable manner facilitating the splicing of belt ends of varying thicknesses. As aforementioned, the bar assembly 14 is pivotably supported on the clamping arrangement tubes 40 by rod 60 and, accordingly, it will be understood that the bar assembly 14 is pivotable in the above-described operational disposition of the present apparatus 10 about a substantially horizontal axis for movement in a substantially vertical plane coincident with the direction in which the bar assemblies 12, 14 are drawn together by the bolt 59. The arrangement of the bracket 48 of the clamping arrangement 18 for receiving insertably therethrough the end 12" of the bar assembly 12 similarly permits generally pivotable positioning movement of the bar assembly 12 about a substantially horizontal axis at its end 12" in the same vertical plane in that the cross-member 48" of the bracket 48 extending horizontally between the upper ends of its legs 48' acts substantially as a fulcrum point for the aforesaid positioning movement of the bar assembly 12 thereabout. It will accordingly be seen that the two bar assemblies 12, 14 are cooperatively pivotable independently to be adjustably positionable respectively so as to permit substantially parallel disposition thereof, and of their respective engaging surfaces 24, at varying spacings therebetween whereby belt ends of differing thicknesses may be accommodated. That is, regardless of the thickness of the belt ends 16', the above-described operation in pivotably positioning the bar assembly 12 about cross-member 48" of the bracket 48 into proper assemblage with the clamping arrangement 18 and the bar assembly 14 effects, upon the superposed contacting by the bar assembly 12, pivoting of the bar assembly 14 about the rod 60 to bring it into substantially parallel relation with the bar assembly 12. The subsequent tightening of the bolt 59 following its insertion through the holes 64 of the bar assembly 12 and the holes 58 of the spacer tube 50 simultaneously causes a relatively small degree of further pivoting of the bar assembly 12 about the bracket cross-member 48" and of the bar assembly 14 about the rod 60 thereby cooperatively to bring the engaging surfaces 24 of the two bar assemblies 12, 14 into substantially continuous, uniform surface contact of the opposite sides of the belt ends 16' and to distribute the clamping pressure thus exerted substantially uniformly along the longitudinal extent of the juxtaposed belt ends 16'.

It will be understood that, while the operational disposition of the bar assemblies 12, 14 in parallel relation to each other and further the operational angular orientation of the bar assemblies 12, 14 and the bolt 59 are always the same in the present apparatus irrespective of the belt thickness, the disposition of the bar assemblies 12, 14 relative to the tubes 40 and the spacer tube member 50 of the clamping arrangement 18 will vary depending upon the thickness of the belt ends being spliced. The above-described rotational mounting of the spacer tube member 50 and the slidable insertion of the bar assembly 12 in the bracket 48 permit the cooperative adjustable positioning of the holes 58 of the spacer tube member 50 and the bolt 59 to facilitate the threaded engagement thereof in various dispositions of the bar assemblies 12, 14 relative to the tubes 40 and the spacer tube member 50.

To best facilitate the proper positioning of the belt ends 16' on the engaging surface 24 of the platen assembly 22 of the bar assembly 14 preliminary to the above-described clamping assemblage of the bar assembly 12 with the bar assembly 14 and clamping arrangement 18, the bar assembly 14 is provided with an auxiliary belt retaining arrangement, generally indicated at 66 in FIG. 1, on opposite sides of the platen assembly 22 of the bar assembly 14 for gripping each belt 16 at a spacing from its belt end 16' to hold the belt ends 16 in the proper splicing position desired. For this purpose, the LEXAN sheet 26 and the asbestos sheet 28 of the platen assembly 22 of the bar assembly 14 are substantially wider than the side 20' of the square steel tube 20 to which they are affixed whereas the platen assembly 22 of the bar assembly 14 is substantially identical in width with its steel tube 20, whereby the LEXAN and asbestos sheets 26, 28 of bar assembly 14 will extend outwardly beyond each side the bar assembly 12 in the opposed, facing assembly of the bar assemblies 12, 14. Four conventional bolts 68 extend upwardly through and are rigidly affixed to the LEXAN and asbestos sheets 26, 28 of the bar assembly 14 in upstanding disposition at each end of each outward longitudinal side edge of such LEXAN and asbestos sheets 26, 28, the upper ends of the bolts 68 being threaded to receive conventional wing nuts 69. A pair of longitudinal square steel tubes 70 of smaller cross sectional area than the tubes 20 and 40 are provided with transversely aligned holes in the opposite sides thereof at each of their respective ends, the holes of each tube 70 being spaced therealong equivalently to the longitudinal spacing between the bolts 68 on each side of the platen assembly 22 of the bar assembly 14, whereby the holes of each tube 70 are adapted to receive insertably therethrough the bolts 68 of one side of the platen assembly 22 of the bar assembly 14 for mounting of the tubes 70 on the bolts 68. It will, therefore, be seen that, upon the proper positioning of the belt ends 16' on the engaging surface 24 of the bar assembly 14 as above-described, the tubes 70 may be respectively mounted on the bolts 68 to engage each belt 16 a small spacing from its end 16' and the wing nuts 69 thereafter threaded mounted on the bolts 68 to secure the tubes 70 in such engagement of the belts 16 thereby to hold the belt ends 16' in the desired splicing position. As will be understood, the spacing between the tubes 70 is more than sufficient for clamping of the bar assembly 12 in assemblage with the bar assembly 14 and the clamping arrangement 18 as previously described.

According to another aspect of the present invention, the apparatus 10 is particularly arranged to supply electrical current to and cause it to flow through the respective stainless steel sheets 34 of the platen assemblies 22 of the bar assemblies 12, 14 for operation of the stainless steel sheets 34 as resistive heating elements for heating of the respective engaging surfaces 24 of the bar assemblies 12, 14. As mentioned above, the particular arrangement by which the stainless steel sheets 34 are affixed by the nut and bolt arrangements 36 with the other composite sheets of their respective platen assemblies 22 is important and facilitates such heating function of the stainless steel sheets 34. Specifically, the stepped end 34' of the stainless steel sheet 34 at the end 12' of the bar assembly 12 and the copper plate 76 associated therewith are affixed to the LEXAN sheet 26 and the aforesaid one side 20' of the steel tube 20 of the bar assembly 12 adjacent its end 12' by two steel bolts 36 countersunk in the copper plate 76 which bolts 36 respectively extend transversely through the LEXAN sheet 26, through oversized holes 72 in the side 20' of the steel tube 20 which prevent contact between the bolts 36' and the tube 20, and through an electrically insulative retaining block 74 disposed within the tube 20 on the inwardly facing surface of its aforesaid one side and are secured within the tube 20 by nuts 36". One end 76' of the copper plate 76 extends transversely outwardly from the bar assembly 12 and has affixed thereto an upstanding threaded steel bolt 78. The opposite stepped end 34" of the stainless steel sheet 34 of the bar assembly 12 and the copper plate 77 associated therewith are affixed to the LEXAN sheet 26 and the side 20' of the steel tube 20 of the bar assembly 12 by another pair of countersunk steel bolts 36 which extend through both the asbestos sheet 28 and the side 20' of the steel tube 20 and are secured within the tube 20 by steel nuts 36" tightened contactingly against the inner surface of the side 20' of the tube 20.

The stainless steel sheet 34 of the bar assembly 14 is generally similarly affixed to the LEXAN sheet 26 and the one side 20' of the steel tube 20 of the bar assembly 14. In contrast, however, to the bar assembly 12, the LEXAN sheet 26 of the bar assembly 14 extends slightly beyond the end of the steel tube 20 at end 14' of the bar assembly 14, the correspondingly stepped end 34' of the stainless steel sheet 34 of the bar assembly 14 and its associated copper plate 76 being affixed to such extending portion of the LEXAN sheet 26 by a pair of countersunk bolts 36 extending therethrough and secured on the opposite side thereof by nuts 36", one end 76' of the copper plate 76 extending transversely outwardly from the bar assembly 14 and having an upstanding steel bolt 82 affixed thereto. The opposite stepped end 34" of the stainless steel sheet 34 of the bar assembly 14 and its associated copper plate 77 are affixed to the LEXAN sheet 26 and to the side 20' of the steel tube 20 of the bar assembly 14 adjacent the opposite end 14" thereof by another pair of countersunk steel bolts 36 which extend through both the LEXAN sheet 26 and the side 20' of the steel tube 20 and are secured within the tube 20 by steel nuts 36" tightened contactingly against the inner surface of the side 20' of the tube 20.

The respective bolts 78 and 82 of the two bar assemblies 12, 14 are adapted for connection by appropriate nuts 81 to the opposed positive and negative terminals 79, 83 of a conventional direct current (D.C.) electrical source (not shown) whereby it will be understood an electrical circuit between the terminals 78, 83 may be completed in the operatively assembled apparatus 10 through and between the stainless steel sheets 34. As is known, stainless steel is more resistive to electrical conduction therethrough than ordinary conventional steel and, for this reason, the stainless steel sheets 34 are affixed in the above-described manner as part of their respective platen assemblies 22 such that the sheets 34 are electrically insulated from their respectively associated steel tubes 20 at the ends 34' and substantially along the entire length of the sheets 34 by means of the above-described construction and are electrically joined respectively to the tubes 20 only at their ends 34" by the bolts 36 thereat. As will be understood, contact between the stainless steel sheets 34 and the screws 30 of each platen assembly 22 is prevented by the TEFLON tape 32 between the stainless steel and asbestos sheets 34, 30 of each platen assembly 22. The nut and bolt arrangements 36 at the ends 34" of the stainless steel sheets 34, the tubes 20, the bracket 48, the bolt 59, the tubes 40 and the rod 60 are all constructed of steel and thereby are good electrical conductors and since these components of the apparatus 10 are serially joined in direct surface contact by the operative assembly of the apparatus 10 as hereinabove described, it will be understood that, upon connection of the bolts 78, 82 to the terminals 79, 83 and energization of the electrical source thereof, the electrical current generated thereby will flow from the negative one of the terminal 79, 83, which as will be understood may be connected to either of the bolts 78, 82, successively through such bolt 78 or 82, through the copper plate 76 associated therewith and therefrom through the stainless steel sheet 34 associated therewith, through copper plate 77 and the nut and bolt arrangement 36 at the end 34" of such stainless steel sheet 34, through the steel tube 20 of the bar assembly of such stainless steel sheet 34, through the components of the clamping arrangement 18, through the steel tube 20 of the other bar assembly, through the nut and bolt arrangement 36 and the copper plate 77 at the end 34" of the stainless steel sheet 34 of such other bar assembly, and through the stainless steel sheet 34 of such other bar assembly to the copper plate 76 at the end 34' of such stainless steel sheet 34 and therefrom to the positive one of the terminals 79, 83. The resistance of the two stainless steel sheets 34 to the flow of electrical current therethrough will cause heat to be generated in the sheets 34 which will be transmitted to the belt ends 16' gripped between the bar assemblies 12, 14 causing the thermoplastic material of their outer surfaces to plasticize and meltingly flow together and between the meshed teeth thereof thereby to splice the belt ends by fusion of their thermoplastic outer surfaces. Notably, the electrical source employed is preferably of a relative low voltage, for example, twelve volts (12 V), and accordingly the direct current produced thereby does not create any danger of electrical shock to persons contacting the apparatus 10 during its operation in the above-described manner.

To aid in the distribution of the heat generated by the stainless steel sheets 34 uniformly along the full extent of the juxtaposed belt ends 16' to be spliced, two separate stainless steel sheets 86 are provided for respective disposition intermediate the engaging surfaces 24 of the bar assemblies 12, 14 and the opposite sides of the belt ends 16' in the clamped assemblage of the apparatus 10 in readying it for splicing operation. One stainless steel sheet 86 is of approximately the same width as the LEXAN and asbestos sheets 26, 28 of the platen assembly 22 of the bar assembly 14 and, accordingly, is adapted to be disposed intermediate the engaging surface 24 of the bar assembly 14 and the undersides of the belt ends 16' and the other stainless steel sheet 86 is slightly greater in width than the LEXAN, asbestos and stainless steel sheets 26, 28, 34 of the platen assembly 22 of the bar assembly 12 and, accordingly, is adapted to be disposed intermediate the engaging surface 24 of the bar assembly 12 and the upwardly facing sides of the belt ends 16'. As will be understood, the portion of each stainless steel sheet 86 most closely and directly adjacent the stainless steel sheet 34 of the bar assembly 12, 14 with which it is associated while in the clamped assemblage of the apparatus 10 as described above, will be heated by its associated stainless steel sheet 34 to approximately the same temperature thereof, but the other portions of each stainless steel sheet 86 outwardly of its associated stainless steel sheet 34 will be heated thereby to progressively lower temperatures in direct relation to the distance of such other portions outwardly from the associated stainless steel sheet 34. In this manner, a temperature gradient is created in the stainless steel sheets 86 ranging from a low temperature of approximately room temperature at the outward edges of the stainless steel sheets 86 gradually increasing to a high temperature approximately the same as that of the stainless steel sheets 34 directly adjacent their respectively associated stainless steel sheets 34. Advantageously, this temperature gradient in the stainless steel sheets 86 concentrates the heat generated by the stainless steel sheets 34 at the meshed teeth of the juxtaposed belt ends 16' to cause melting of the thermoplastic material thereat to flow together and between the teeth for effective bonded fusion, with the gradual decrease in temperature in the stainless steel sheets 86 outwardly from the belt ends 16' effectively serving to produce an extremely smooth belt surface across the bonded belt ends 16' with the location of the splice and the teeth thereof being virtually unnoticeable in the resultant splice. This is to be contrasted to belt splices produced on conventional apparatus which provide no such temperature gradient but instead apply heat uniformly to all contacted portions of the belt ends being spliced which causes some of the melted thermoplastic material of the belt ends to be forced outwardly from between the platens of such conventional apparatus under the pressure exerted thereby and creates a ridge of such material at each opposite side of the splice which is unsightly and must be ground off the belt prior to its use. Preferably, the stainless steel sheets 86 are relatively highly polished to insure that a smooth belt surface results at the splice and further to reduce any tendency of the belt ends 16' to stickingly adhere thereto upon their heated plasticization.

To permit the selective control of the temperature to which the belt ends 16' are heated by the stainless steel sheets 34, a conventional thermostatic sensing device 84 of the type including a thermocouple circuit is mounted within the steel tube 20 of the bar assembly 12 and extends through the side 20' of the tube 20, the LEXAN sheet 26 and the asbestos sheet 28 for monitoring the temperature of the stainless steel sheet 34 of the bar assembly 12, the sensing device 84 being operatively connected to a conventional female plug 85 to permit operative association with the electrical source in a conventional manner for deenergizing the electrical source once the temperature generated in the stainless steel sheets 34 reaches a predetermined desired value, for instance, approximately 350° Fahrenheit for splicing belts having an outer surface of PVC and 340° Fahrenheit for splicing belts having an outer surface of polyurethane. Upon the deactuation of the electrical source, the apparatus 10 is permitted to cool to a desired lower temperature before removal of the spliced belt ends 16' therefrom.

The present apparatus will be understood by these skilled in the art to provide significant advantages over conventional belt splicing apparatus. Thus, while conventional belt splicing machines are relatively large and heavy and therefore are not portable in the traditional sense, the present apparatus is relatively small, the preferred embodiment illustrated being only slightly more than four feet in length and approximately one foot in width and height; relatively lightweight, being easily carried by one person; and is accordingly easily transported from one location to another. Therefore, the present apparatus now makes possible the splicing of belts at their location of intended use and readily facilitates the accurate construction of endless belts and the like to desired dimensions, the proper dimensioning of spliced belts being a problem in the use of conventional belt splicing apparatus with which belts must be spliced at the location of the splicing apparatus and transported therefrom to the location of use. This advantage of the present apparatus, of course, also readily facilitates the on site repair of belts as opposed to the conventional necessity of transporting damaged belts to the location of a belt splicing apparatus for repair.

Perhaps an even more important advantage of the present invention lies in its conservative use of electrical energy in comparison with conventional belt splicing apparatus. As is known, a typical conventional belt splicing apparatus employs a relatively large heating mass which will be understood requires a considerable amount of time, generally forty-five to sixty minutes, to heat to a sufficiently high temperature, such as indicated above, for splicing operation, and further requires a considerable amount of time to cool, generally twenty to thirty minutes when cooling is accelerated by use of water cooling arrangements. In the present invention, the only components of the apparatus 10 which require direct heating are the stainless steel sheets 34 which, because they are relatively thin without significant mass, heat to the desired temperature relatively quickly, generally on the order of as little as three minutes and no greater than five to ten minutes, and cool equally quickly by air circulation thereabout. As a result, not only may substantial savings in the related costs of energy usage associated with belt splicing be realized by the present apparatus, substantial reductions in related time and labor costs may also be achieved.

The present apparatus further has been discovered effectively to splice belt ends fusingly without the conventional use of supplemental thermoplastic bonding material. As indicated above, conventional wisdom in the art of belt splicing by thermoplastic fusion is that it is advisable, if not necessary, to apply to the surfaces of the belt ends to be spliced additional thermoplastic material, ordinarily in a liquid form, of the same type as the material of which the belts are constructed to aid in the bonding of the belt ends to enhance the strength of the splice and, even in the conventional employment of this method of splicing, the location of the resultant splice is readily visible in the belt, often creating a relatively unsightly appearance to the splice, and further is ordinarily weaker than the remaining portions of the belts. With the present apparatus, it has been found that a modified method of thermoplastic belt splicing is now possible wherein belt ends 16' prepared in the above-described manner and juxtaposedly, interdigitatedly, arranged are fusingly bonded by merely applying heat and pressure to the opposite side faces of the belt ends 16' to cause the thermoplastic material thereof to meltingly flow together and between the meshed teeth thereof, following which the cooling of the belt ends 16' to permit solidification of the thermoplastic material completes the splicing operation. By this procedure, a belt splice entirely unlike conventional belt splices is produced which splice is effectively blended smoothly with the remaining lengths of the respective belts 16 and may be visibly discerned from adjacent portions of the belts 16, if at all, only upon a close, careful inspection of the belt surfaces. Furthermore, and perhaps more importantly, the belt splice thus produced has been found to be considerably stronger than conventional belt splices.

It is to be noted that the present apparatus and method are equally adapted for splicing the ends of belts of the type only one side of which has an outer surface or coating of thermoplastic material. As will of course be appreciated, the same preparatory steps are performed with belts of this type to provide for interdigitated co-planar juxtaposition of the belt ends. Once so prepared, the belt ends are arranged in the described juxtaposition on the engaging surface 24 of the platen assembly 22 of the bar assembly 14 with their respective thermoplastic and non-thermoplastic sides in correspondence with the thermoplastic sides downwardly facing against such engaging surface 24. While it will be understood that the correspondingly registering thermoplastic sides of the belt ends 16' accordingly may be meltingly fused by assemblage and operation of the apparatus 10 in the manner described hereinabove, the upwardly facing non-thermoplastic sides of the belt ends 16' cannot and, therefore, a length of loosely woven or knit textile scrim fabric 88 is placed superposedly over the juxtaposed belt ends 16' on the non-thermoplastic sides thereof and a length of solid thermoplastic sheet material 90, preferably polyurethane because of its significant strength, is placed superposedly over the scrim fabric 88 prior to the completion of the above-described operational assemblage of the apparatus 10 (See FIGS. 8 and 9). The operation of the apparatus 10 is then carried out in the same manner described above, the thermoplastic sides of the belt ends 16' meltingly flowing together and between the meshed teeth thereof and the length of thermoplastic sheet material 90 meltingly flowing into and across the scrim fabric 88 into contact with the juxtaposed non-thermoplastic sides of the belt ends 16' and between the meshed teeth thereof. Subsequent cooling of the belt ends 16' effects solidification of the melted thermoplastic material of the thermoplastic sides thereof for bonding thereof across and between the meshed teeth thereof, and solidification of the melted length of thermoplastic material 90 for bonding thereof to the scrim material, to the non-thermoplastic sides of the belt ends 16' and across and between the meshed teeth thereof, thereby to provide a bond between the belt ends 16' of approximately the same strength as the bond between belt ends 16' having two thermoplastic sides.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. Apparatus for splicing two belt ends or the like having outer surfaces of thermoplastic material comprising a pair of electrically conductive longitudinal bar means adapted for opposed facing disposition for engaging therebetween said two belt ends in juxtaposed relation for splicing thereof and electrically conductive clamping means for selectively engagingly drawing said pair of bar means together to grippingly retain said belt ends therebetween and to electrically connect said pair of bar means for flow of electrical current therebetween, said pair of bar means including on their respective facing sides respective longitudinal platen means forming respective belt engaging surfaces for substantially continuous surface contact along said belt ends on opposite sides thereof, each said platen means including longitudinal electrical heating means for heating its respective engaging surface, each said heating means being electrically connected at one end thereof to its respective bar means and being electrically insulated from its respective bar means along its entire remaining length with the opposite end of each said heating means being electrically connected to one of two opposed terminals of an electrical source, thereby providing upon clamped assembly of said pair of bar means and said clamping means a complete electrical circuit between said terminals through each said heating means and respectively therefrom through and between said pair of bar means and said clamping means for generating heat in each said heating means upon energization of said electrical source to splice said belt ends by fusion of the thermoplastic material thereof.

2. Apparatus for splicing belt ends according to claim 1 and characterized further in that one of said pair of bar means is supported intermediate its ends on said clamping means for pivotal movement of said one bar means in a plane generally coinciding with the direction of drawing by said clamping means whereby operation of said clamping means to draw together said pair of bar means effects adjusting pivotal movement of said one bar means to provide uniform surface contact between said engaging surface of its said platen means and said belt ends and to distribute the clamping pressure exerted by said clamping means uniformly along said belt ends.

3. Apparatus for splicing belt ends according to claim 2 and characterized further in that said clamping means is arranged for engaging the other of said pair of bar means at opposite ends thereof when in opposed facing disposition with said one bar means and for permitting generally pivotable positioning of said other bar means about one end thereof in said coinciding plane of movement of said one bar means for pivotal movement of said other bar means cooperatively with said one bar means, whereby said pair of bar means are pivotably positionable cooperatively for substantially parallel disposition thereof at varying spacings therebetween for accommodating belt ends of varying thicknesses and operation of said clamping means to draw said pair of bar means together effects cooperative pivotal movement of said pair of bar means to maintain parallel orientation thereof for uniform surface contact of said belt ends by said engaging surfaces of said platen means of said pair of bar means and uniform distribution of the clamping pressure exerted by said clamping means along said belt ends.

4. Apparatus for splicing belt ends according to claim 3 and characterized further in that said clamping means includes a bracket adapted to receive slidably therethrough said one end of said other bar means to provide a pivotal fulcrum therefor and bolt means adapted to engage the other end of said other bar means and adjustably positionable for clamping operation in various pivoted dispositions of said other bar means.

5. Apparatus for splicing two belt ends or the like having outer surfaces of thermoplastic material comprising a pair of longitudinal bar means adapted for opposed facing disposition for engaging therebetween said two belt ends in juxtaposed relation for splicing thereof, said pair of bar means including on their respective facing sides respective longitudinal platen means forming respective belt engaging surfaces for substantially continuous surface contact along said belt ends on opposite sides thereof, each said platen means including longitudinal electrical heating means operatively associated with an electrical source for heating its respective engaging surface, and clamping means for selectively engagingly drawing said pair of bar means together to grippingly retain said belt ends therebetween, one of said pair of bar means being supported intermediate its ends on said clamping means for pivotal movement in a plane generally coinciding with the direction of drawing by said clamping means, said clamping means being arranged for engaging the other of said pair of bar means at opposite ends thereof when in opposed facing disposition with said one bar means and for permitting generally pivotable positioning of said other bar means about one end thereof in said coinciding plane of movement of said one bar means, whereby said pair of bar means are pivotably positionable cooperatively for substantially parallel disposition thereof at varying spacings therebetween for accommodating belt ends of varying thicknesses and operation of said clamping means to draw said pair of bar means together effects cooperative pivotal movement of said pair of bar means to maintain parallel orientation thereof for uniform surface contact of said belt ends by said engaging surfaces of said platen means of said pair of bar means and uniform distribution of the clamping pressure exerted by said clamping means along said belt ends.

6. Apparatus for splicing two belt ends according to claim 5 and characterized further in that said clamping means includes a bracket adapted to receive slidably therethrough said one end of said other bar means to provide a pivotal fulcrum therefor and bolt means adapted to engage the other end of said other bar means and adjustably positionable for clamping operation in various pivoted dispositions of said other bar means.

7. Apparatus for splicing two belt ends according to claim 1 or 5 and characterized further in that one of said bar means includes auxiliary belt retaining means on opposite sides of its respective platen means for grippingly engaging each belt at a spacing from its respective said belt end to hold said belt ends in proper splicing position between the respective platen means of said pair of bar means.

8. Apparatus for splicing two belt ends according to claim 1 or 5 and characterized further in that each said platen means includes heat conductive heat distribution means at its engaging surface for concentrating the heat generated by the respective heating means of each said platen means at the location of juxtaposition of the belt ends and for applying gradually lesser heat to said belt ends progressively outwardly therefrom thereby to produce a smooth surface to said belt ends across the splice therebetween.

9. Apparatus for splicing two belt ends according to claim 1 or 5 and characterized further in that thermostatic sensing means for sensing the temperature of at least one said heating means and operatively associated with said electrical source for deenergization thereof when said heating means reaches a predetermined desired temperature.

* * * * *